(12) United States Patent
Kalajan

(10) Patent No.: US 11,963,072 B2
(45) Date of Patent: Apr. 16, 2024

(54) COMPUTER-IMPLEMENTED SYSTEM AND METHOD FOR UPLOADING MEDIA TO AN INSPECTION RECORD VIA THE MULTIMEDIA MESSAGING SERVICE (MMS)

(71) Applicant: VuSpex Inc., Watsonville, CA (US)

(72) Inventor: Kevin Kalajan, Arroyo Grande, CA (US)

(73) Assignee: VuSpex Inc., Watsonville, CA (US)

( * ) Notice: Subject to any disclaimer, the term of this patent is extended or adjusted under 35 U.S.C. 154(b) by 338 days.

(21) Appl. No.: 17/587,596

(22) Filed: Jan. 28, 2022

(65) Prior Publication Data

US 2023/0247393 A1    Aug. 3, 2023

(51) Int. Cl.
*H04W 4/14*     (2009.01)
*H04W 8/26*     (2009.01)

(52) U.S. Cl.
CPC ............... *H04W 4/14* (2013.01); *H04W 8/26* (2013.01)

(58) Field of Classification Search
CPC .................................. H04W 4/14; H04W 8/26
See application file for complete search history.

(56) References Cited

U.S. PATENT DOCUMENTS

| | | |
|---|---|---|
| 7,639,943 B1 | 12/2009 | Kalajan |
| 8,385,950 B1 | 2/2013 | Wagner |
| 8,418,231 B2 | 4/2013 | Denny |
| 8,665,337 B2 | 3/2014 | Mikawa |
| 8,818,018 B2 * | 8/2014 | Simske ................ G06T 1/0028 382/100 |
| 10,402,064 B1 * | 9/2019 | Al-Sallami ............ G06Q 20/12 |
| 11,163,941 B1 | 11/2021 | Al Majid |
| 11,190,679 B2 | 11/2021 | Ebsen |
| 11,228,551 B1 | 1/2022 | Baron |
| 2016/0267270 A1 * | 9/2016 | Lee ........................ G06F 21/564 |
| 2017/0332421 A1 * | 11/2017 | Sternberg ............ H04W 12/069 |

(Continued)

*Primary Examiner* — Adam D Houston
(74) *Attorney, Agent, or Firm* — Inventive Law Inc.; Jim H. Salter

(57) ABSTRACT

A computer-implemented system and method for uploading media to an inspection record via the multimedia messaging service (MMS) are disclosed. An example embodiment includes: receiving a media upload authorization from an authority representative via an authority interface of an authority representative computing system in data communication with a media upload system on a data network; using the media upload system to prompt a field agent (FA) to initiate a media upload to a telephony service provider (TSP) computing system via an FA interface in response to the media upload authorization, the FA interface being a field agent mobile device in data communication with the TSP computing system via a short message service (SMS) or multimedia message service (MMS) protocol; receiving a conditional notifier from the TSP at the media upload system via a TSP interface of the TSP computing system in response to the FA media upload; using the media upload system to verify the FA media upload based on content in the conditional notifier; and using the media upload system to notify an inspection process (INSP) of the completion of the media upload via an INSP interface of an inspection management computing system in data communication with the media upload system on the data network.

20 Claims, 10 Drawing Sheets

(56) References Cited

U.S. PATENT DOCUMENTS

| | | | |
|---|---|---|---|
| 2022/0197620 A1* | 6/2022 | Vihar | ........................ G06F 8/65 |
| 2023/0247393 A1* | 8/2023 | Kalajan | ................... H04W 8/26 |
| | | | 455/466 |
| 2023/0308499 A1* | 9/2023 | Kalajan | ............... H04L 65/1083 |

* cited by examiner

Identification of Inspection and Field Agent

Sample Pool Database

| Row ID | FA Phone | TSP Phone | Inspection ID | Expiration |
|---|---|---|---|---|
| 1 | 5305751111 | 6022469339 | 100 | 2021-05-01 12:00:00 |
| 2 | null | 6022469999 | null | null |

Fig. 4

Webhook Processing

COMPUTER-IMPLEMENTED SYSTEM AND METHOD FOR UPLOADING MEDIA TO AN INSPECTION RECORD VIA THE MULTIMEDIA MESSAGING SERVICE (MMS)

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and disclosure as described below and to the drawings that form a part of this document: Copyright 2021-2022, VuSpex Inc., All Rights Reserved.

TECHNICAL FIELD

This patent application relates to the field of short message service (SMS) and multimedia message service (MMS), inspections (both virtual and traditional), network media and data communications, and telephony in the various example embodiments disclosed herein.

BACKGROUND

Over the past ten years, the Internet (public networking) and SMS/MMS (short/multimedia message service) "text messages" have been used to exchange text and rich content (e.g. video or image content) for personal communications as well as business communications. For example, an insurance company may allow an insured to "text in" documents or other content related to damage to their vehicle as proof, instead of an adjuster personally visiting the vehicle.

Furthermore, in the past 20 years, the telecommunications industry and the Internet have merged with companies allowing software access to phone numbers to automate processing of such content. Examples of such companies are Twilio™ and Amazon™ AWS.

U.S. Pat. No. 9,674,575 references the concept of a "Routing Processor" and media rules to distribute media to one or more switches.

U.S. Pat. No. 9,426,633 references the concept of receiving an emergency service request via an MMS message and then separating the text from the media portions and then forwarding the text message to an emergency service answering position.

However, these patents and other related conventional technologies do not provide a system or method for managing the upload of media via SMS and MMS in a way that assigns the uploaded media to specific inspection records, nor do they address the dynamic management of MMS-capable phone numbers in a pool to support message identification. Furthermore, conventional technologies do not allow an authority to authorize the "text in" of media for an inspection. This capability would eliminate the problems associated with installing an "app" or having to navigate to a web portal with a phone browser, creating an account, and figuring out how to upload content from a phone. Thus, a computer-implemented system and method for uploading media via MMS/SMS is needed.

BRIEF DESCRIPTION OF THE DRAWINGS

Embodiments are illustrated by way of example and not limitation in the figures of the accompanying drawings, in which:

FIG. 4 illustrates an example embodiment of sample entries in the POOL database;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a computer-implemented system and method for uploading media to an inspection record via the multimedia messaging service (MMS) are disclosed. In the disclosed example embodiments, a system and method manages the upload of media via SMS and MMS in a way that assigns the uploaded media to specific inspection records, and provides the dynamic management of MMS-capable phone numbers in a pool to support message identification. The disclosed example embodiments allow an authority to authorize the "text in" of media for an inspection. This capability eliminates the problems associated with installing an "app" or having to navigate to a web portal with a phone browser, creating an account, and figuring out how to upload content from a phone. In various example embodiments, a computer-implemented system and method are disclosed for uploading and managing media via MMS/SMS. Furthermore, in the case of a traditional Virtual Inspection where connectivity becomes nil or reduced, this MMS-based submission can be used to continue content submission for the purpose of the inspection.

Figure 1:
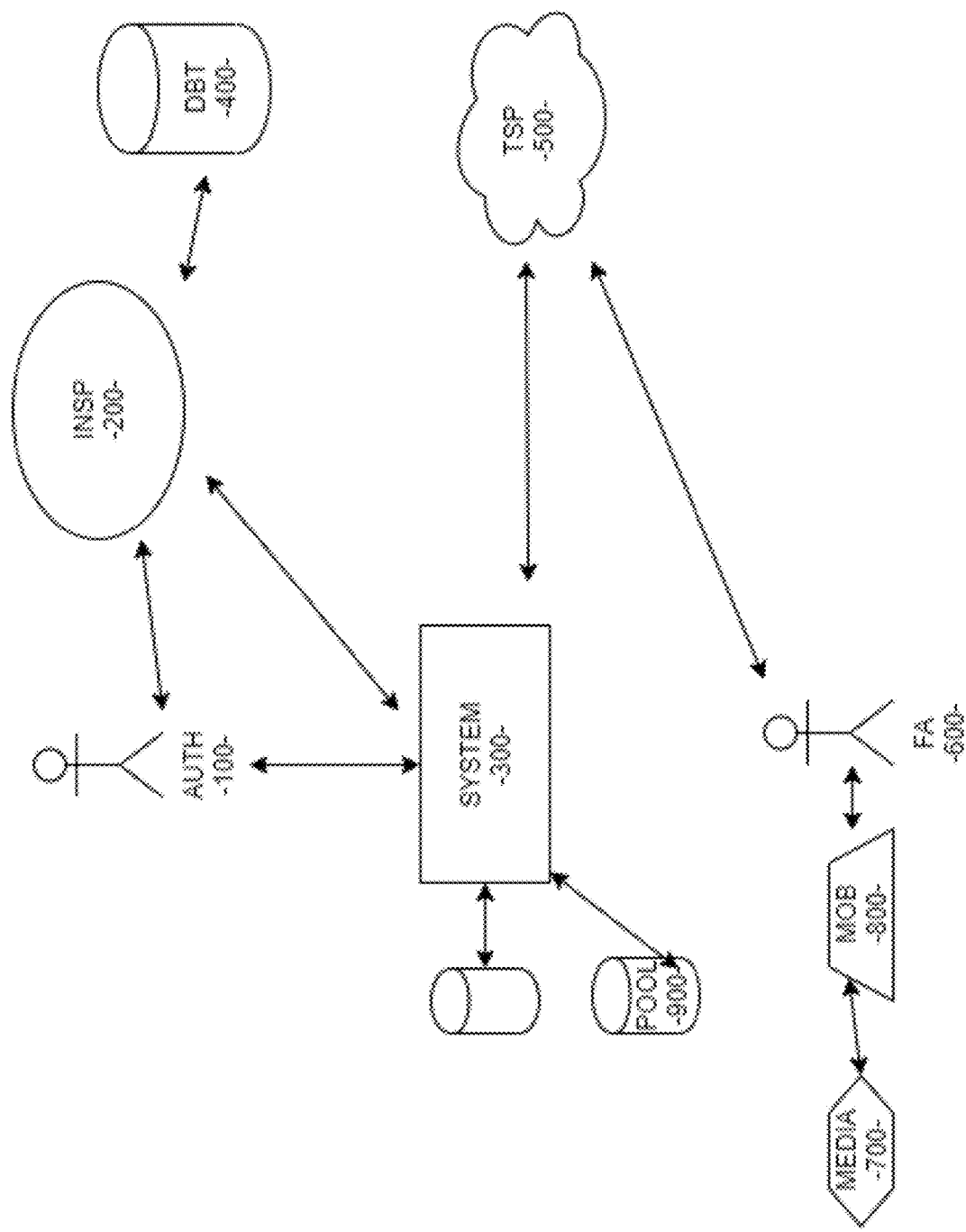
FIG. 1 illustrates an example embodiment showing the overall relationship between the elements of the example embodiment.

Referring to FIG. 1, the diagram illustrates an example embodiment showing the overall relationship between the elements of the example embodiment. In particular, an interface with a user authority ("AUTH") 100 representative computing system is provided to authorize a media upload from a Field Agent ("FA") 600 operating a mobile device ("MOB") 800 that supports SMS and MMS via an FA 600 interface. The AUTH 100 can identify an inspection for which they will allow texted-in media artifacts by the FA 600. Examples of an AUTH 100 can include an inspector for a city or county building department, an insurance company representative, an engineering company representative, or the like. In an example embodiment, AUTH 100 can use an inspection management system, a land management system, or any similar system that maintains lists of things or items or conditions to be inspected. Examples of an FA 600 can include: a building contractor, a homeowner, an individual making an insurance claim after a vehicle accident, or the like. There are no restrictions for who can be an FA 600.

The criteria for why an AUTH 100 would need or allow texted-in media for an inspection are manifold and outside the scope of the embodiments disclosed herein. Nevertheless, the need for texted-in media for an inspection can include convenience, the lack of connectivity to perform a virtual inspection, scheduling problems, excessive cost to travel to where the FA is located, or the like. The example embodiments disclosed herein service these needs and enable a convenient, swift, and inexpensive way to facilitate the uploading and management of texted-in media for an inspection.

Referring again to FIG. 1, an artifact ("MEDIA") 700 represents one or more items of evidence that corroborate something about an inspection. For example, MEDIA 700 may corroborate a failed inspection, a passed inspection, or something that needs work. An example of MEDIA 700 can include a photo of an electrical junction box or damage to an automobile. In an example embodiment, MEDIA 700 can be an image of any format (e.g., JPEG, GIF, JFIF, PNG, etc.), a PDF file, a video (e.g., MP4, 3gpp), an audio file (e.g., wave, mp3, ogg/vorbis, etc.), a Microsoft® Word file, a Microsoft® Excel file, a text file, or any other content that can be represented in a digital form.

Referring again to FIG. 1, an inspection ("INSP") process 200 corresponds to a business workflow element of an inspection management computing system where a physical verification of something within an internal organization or a related third party is required. In an example embodiment, this is an element of building construction (e.g., framing, flooring, septic, electrical, or plumbing) or insurance (e.g., site safety, damage to a vehicle, signs posted, etc.). The INSP 200 can be part of or an interface with an inspection management computing system, a land management system, or any similar system that maintains lists of things or items or conditions to be inspected and which the AUTH 100 can use or interface with to provide one or more items of evidence that corroborate something about an inspection. The INSP 200 can represent one or more inspection or verification processes or activities. The AUTH 100 can provide the one or more items of evidence to the INSP 200 via a media upload across a telecommunications network.

Once the AUTH 100 determines that a given INSP 200 is acceptable for media upload, the AUTH 100 can notify a media upload system ("SYSTEM") 300 that the INSP 200 has authorized media upload from a mobile device ("MOB") 800 that supports SMS and MMS. In an example embodiment, the SYSTEM 300 can be implemented as a network-connected computing system executing software, which provides and manages the data interfaces described herein. Such interfaces can include graphical user interfaces (GUIs), which provide client-facing information displays and user input functionality, such as drop-down lists, clickable links, or the like. The interfaces supported by SYSTEM 300 can also include software Application Programming Interfaces (APIs), with which networked computing systems can interact with SYSTEM 300 on a programmatic basis.

The AUTH 100 can notify the SYSTEM 300 of an INSP 200 upload authorization using any of the interfaces provided by SYSTEM 300. For example, the AUTH 100 can provide an input to a GUI of SYSTEM 300, such as by clicking a button on user interface of SYSTEM 300, entering a choice option in a drop-down list, or by clicking on a link. In another embodiment, the AUTH 100 can provide an input to an API of SYSTEM 300. As a result of one or more of these interactions with the interfaces of SYSTEM 300, a media upload from MOB 800 of FA 600 to INSP 200 can be enabled.

Identification of Inspection and Field Agent

Figure 2:
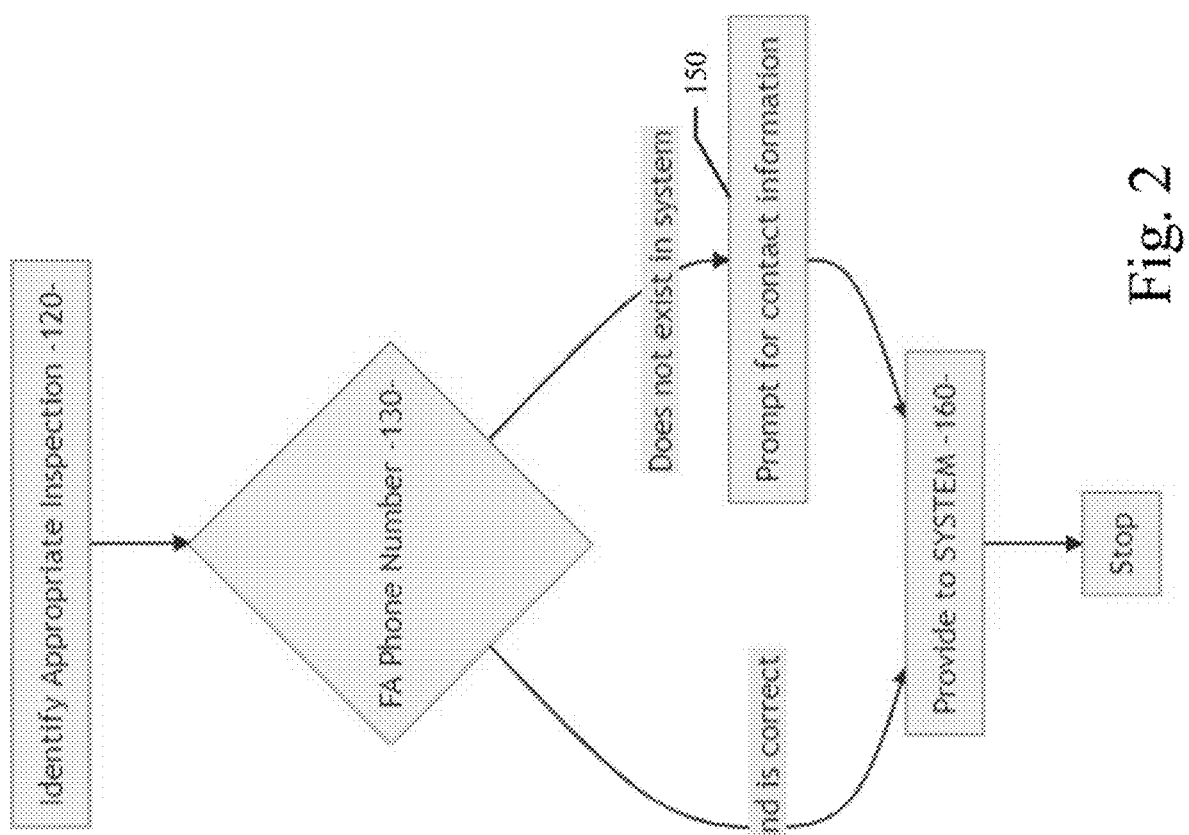
FIG. 2 illustrates an example embodiment of an "Identification of Inspection and Field Agent" process showing the logical process of determining which inspections are relevant for text-in of media and how to manage whether the Field Agent contact information is available or not.

Referring now to FIG. 2, an example embodiment can perform operations to properly identify and obtain contact information for a specific FA 600. This is important so that a data or media upload from the MOB 800 of a particular FA 600 to INSP 200 can be associated with the particular FA 600 and a particular inspection activity. The contact information for the particular FA 600 may or may not be available to the AUTH 100 and may or may not be accurate. Thus, an example embodiment performs a processing flow starting at operation 120, shown in FIG. 2, where the particular FA 600 and the particular inspection activity can be identified. If, at decision block 130, the contact information for the particular FA 600 exists in a SYSTEM 300 database (e.g., POOL database 900) and is deemed correct, the FA 600 contact information is obtained and verified by SYSTEM 300 at operation block 160. If, at decision block 130, the contact information for the particular FA 600 does not exist in a SYSTEM 300 database or is deemed incorrect or stale, the SYSTEM 300 can prompt the AUTH 100 to enter current contact information for the FA 600 at operation block 150. The FA 600 contact information is obtained and verified by SYSTEM 300 at operation block 160. The AUTH 100 can also indicate the FA 600 who will be uploading the media. In an example embodiment, this indication is provided by the AUTH 100 entering the FA 600 phone number or having an INSP 200 record contain the responsible FA 600 phone number through external business processes. Given the contact information for the particular FA 600, the SYSTEM 300 can obtain or generate a specific INSP 200 identifier that associates the particular FA 600 and corresponding MOB 800 with a specific one of the one or more inspection or verification processes or activities of INSP 200. This specific INSP 200 identifier identifies a unique INSP 200 inspection or verification process or activity. In an example embodiment, the SYSTEM 300 can assign a telephone number to the specific one of the one or more inspection or verification processes or activities of INSP 200 to map the media uploaded by the FA 600 to a particular INSP 200 process.

Management of the Pool of Available Phone Numbers

Referring again to FIG. 1, an example embodiment of the SYSTEM 300 can perform operations to maintain a pool ("POOL") database 900 containing records to associate particular FAs 600 with specific inspection or verification processes or activities of INSP 200. The POOL database 900 records can include available phone numbers to allocate to FAs 600. In an example embodiment, the SYSTEM 300 can maintain properties for each POOL 900 record, which can include: outgoing phone number, FA 600 phone number, INSP 200 identifier, initiation/expiration time, etc. (e.g., see FIG. 4). It will be apparent to those of ordinary skill in the art that other data can be stored in POOL database 900 for associating FAs 600 with INSP 200 processes. In an example embodiment, the POOL data can be stored in POOL database 900 for access and update by SYSTEM 300. In the example embodiment, the POOL data can also be stored in a database table ("DBT") 400 for access and update by INSP 200. The DBT 400 can be implemented, in various example embodiments, as a SQL Server, MySQL, PostGRES or a NoSQL datastore such as MongoDB, DynamoDB, CouchDB or Hypertable.

Figure 3:
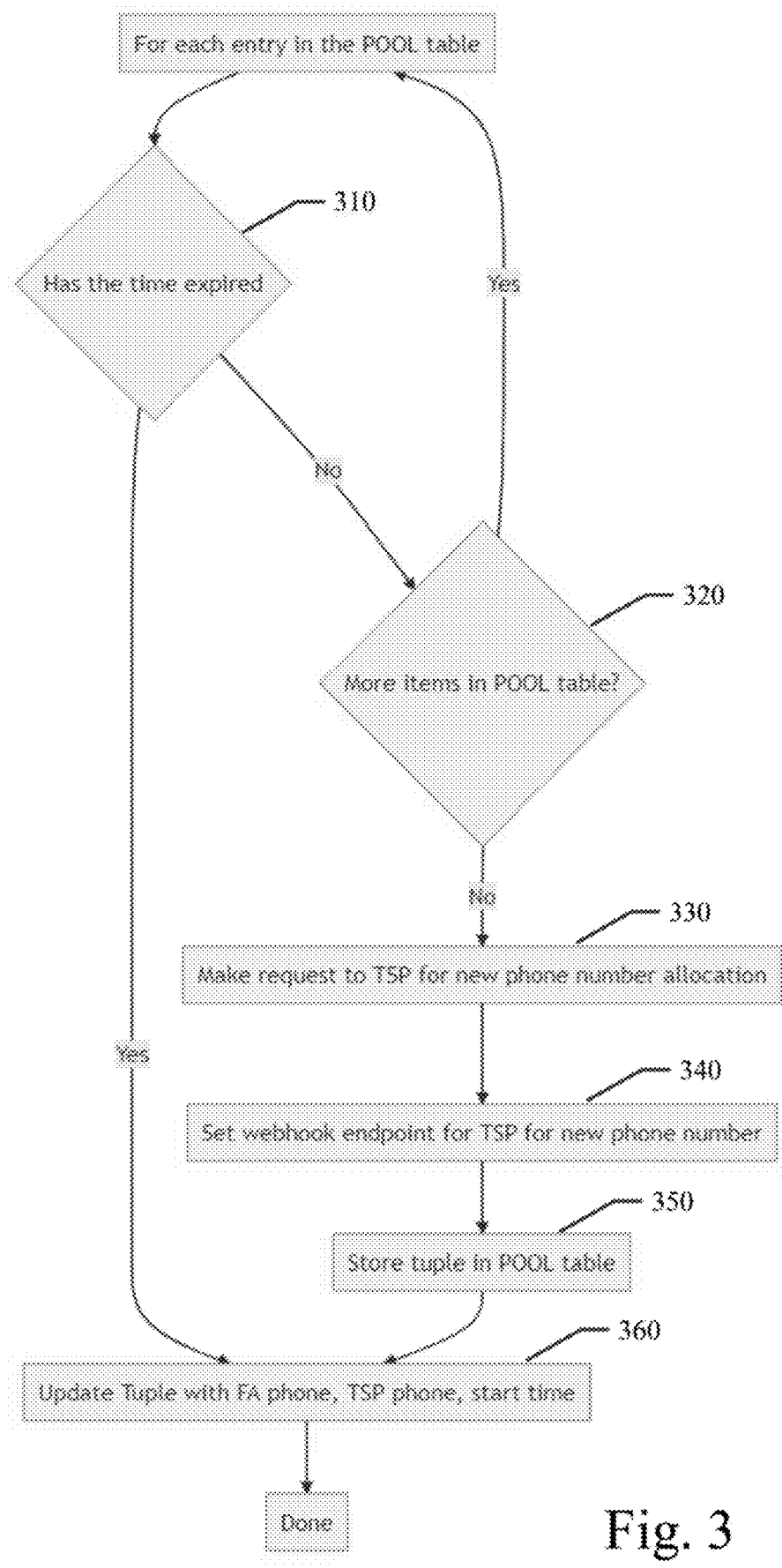
FIG. 3 illustrates an example embodiment of a "POOL Processing" method showing how the pool of available phone numbers is managed and allocated for each inspection.

Referring now to FIG. 3, an example embodiment of the SYSTEM 300 can perform operations to manage the data stored in POOL database 900. In an example embodiment, at decision blocks 310 and 320 shown in FIG. 3, the SYSTEM 300 can analyze each entry in the POOL 900 to determine if the last use of the phone number in each POOL 900 record exceeds the maximum time allowed for a given FA 600 to use a number for an INSP 200. Additionally, note that typically a database "transaction" would be started at this point, and ended upon completion of the POOL 900 processing to ensure that two simultaneous requests do not mis-allocate the POOL 900 entries. In an example embodiment, this expiration or maximum time (e.g., "time-to-live"/TTL) can be a configurable parameter expressed in minutes, seconds, hours, days, etc. The maximum time parameter may be a system-wide setting stored "globally" or a maximum time derived from various combined properties, such as the FA 600 phone number, the INSP 200 identifier, or a specific AUTH 100 in a multi-AUTH system. As such, the maximum/expiration time (e.g., "time-to-live"/TTL) can be derived in a variety of ways. In one example embodiment, the AUTH 100 can be prompted to specify the desired maximum allowed time. In another embodiment, the SYSTEM 300 can calculate the desired maximum allowed time based on a variety of parameters, such as those described above.

Referring again to FIG. 3, if an entry in the POOL 900 is found to have "expired" by virtue of its maximum/expiration allotment time being exceeded, that entry in the POOL 900 is determined to be available for re-use and can be used for the requested INSP 200. As such, a tuple or record corresponding to the available entry in POOL 900 can be updated in processing block 360. In an example embodiment, one method for determining whether an entry in the POOL 900 has exceeded its maximum/expiration allotment time is to compare the last time-of-use or time-of-completion of the telephony service provider ("TSP") 500 phone number to the current time and calculate the difference between the two times to determine if the elapsed number of seconds exceeds the applicable TTL. In another embodiment, the POOL 900 table can store the actual expiry time in epoch seconds (seconds since Jan. 1, 1970) or a timezone-corrected timestamp or a GMT timestamp.

Referring again to FIG. 3 at processing block 330, if no entry is available in the POOL 900 (e.g., all POOL 900 entries are in use or there are no entries at all in the POOL 900), then a new phone number is allocated and inserted into the POOL 900 as shown in processing blocks 330, 340, and 350 of FIG. 3 and described below.

Referring still to FIG. 3 at processing block 330, the SYSTEM 300 can make a request to a TSP 500 via a TSP interface of a TSP computing system to issue a new phone number allocation. This request is also shown in FIG. 1 as a line between SYSTEM 300 and TSP 500. As described above, various conventional services exist that allow software access to telephony services such as SMS and MMS. Examples include TWILIO.COM™ or AMAZON™ AWS. Both of these services allow software developers to request a phone number that can be used for SMS/MMS by software applications (e.g., SYSTEM 300).

In an example embodiment, a request is made to the telephony service provider (TSP) 500 for a new phone number (see processing block 330). In the example embodiment, the request can include an optional specification for the area code and area code and/or prefix. In an example embodiment, the request can also include a requirement for the phone number allocated to support SMS and MMS. In an example embodiment, the request can also contain a property such as "webhook" or "callback," which is a feature used to have the TSP 500 send a notification to the SYSTEM 300 using HTTP or analogous protocols when the FA 600 sends a message via the allocated phone number. A "webhook," "callback," or other conditional notifier can be any mechanism where a service provider notifies a registered component of software via HTTP, HTTP/S, TCP, UDP, SMTP, or analogous protocols where the registered component has requested to be notified if a condition, event, or similar real-time criterion/criteria has been met. In another embodiment, a second request can be made to the TSP 500 to set the webhook to a value corresponding to an endpoint for a given phone number (see processing block 340 in FIG. 3).

The TSP 500 can respond to the request from the SYSTEM 300 with a new phone number and an internal item identifier (ID) for future reference. The new phone number allocated by the TSP 500 can be added as an item, record, or tuple to the POOL database 900 by SYSTEM 300 (see processing block 350 in FIG. 3). FIG. 4 illustrates an example embodiment of sample entries in the POOL database 900. The new phone number allocated by the TSP 500 can also be added as an item, record, or tuple to the database table (DBT) 400. The database entries can be augmented with additional metadata, such as the current (e.g., start) time, the relevant FA 600 phone number, and additional properties (see processing block 360 in FIG. 3, and FIG. 4).

Assigning a POOL Item to be Used

Whether a new POOL 900 item is retrieved from the TSP 500 or an expired POOL 900 item is found to be available as described above in connection with FIG. 3, the new or available phone number and the corresponding POOL 900 item identifier, in an example embodiment, is available to assign to the requested INSP 200. In an example embodiment, the SYSTEM 300 can assign a telephone number to the specific one of the one or more inspection or verification processes or activities of INSP 200 to map the media uploaded by the FA 600 to a particular INSP 200 process. At this time, the POOL 900 item properties for the assigned phone number can be updated in the POOL 900 and the DBT 400. In an example embodiment, the "in-use start time" property can be set to the current time in epoch seconds (seconds since Jan. 1, 1970). Any analogous timestamp can be used as well.

In an example embodiment, an internal FA 600 user ID can be set by the SYSTEM 300 for the relevant POOL 900 record corresponding to the assigned telephone number. Similarly, in the example embodiment, an internal INSP 200 process ID can be set by the SYSTEM 300 for the relevant POOL 900 record corresponding to the assigned telephone number.

Initiating the SMS-Based Conversation with the FA

Figure 5:
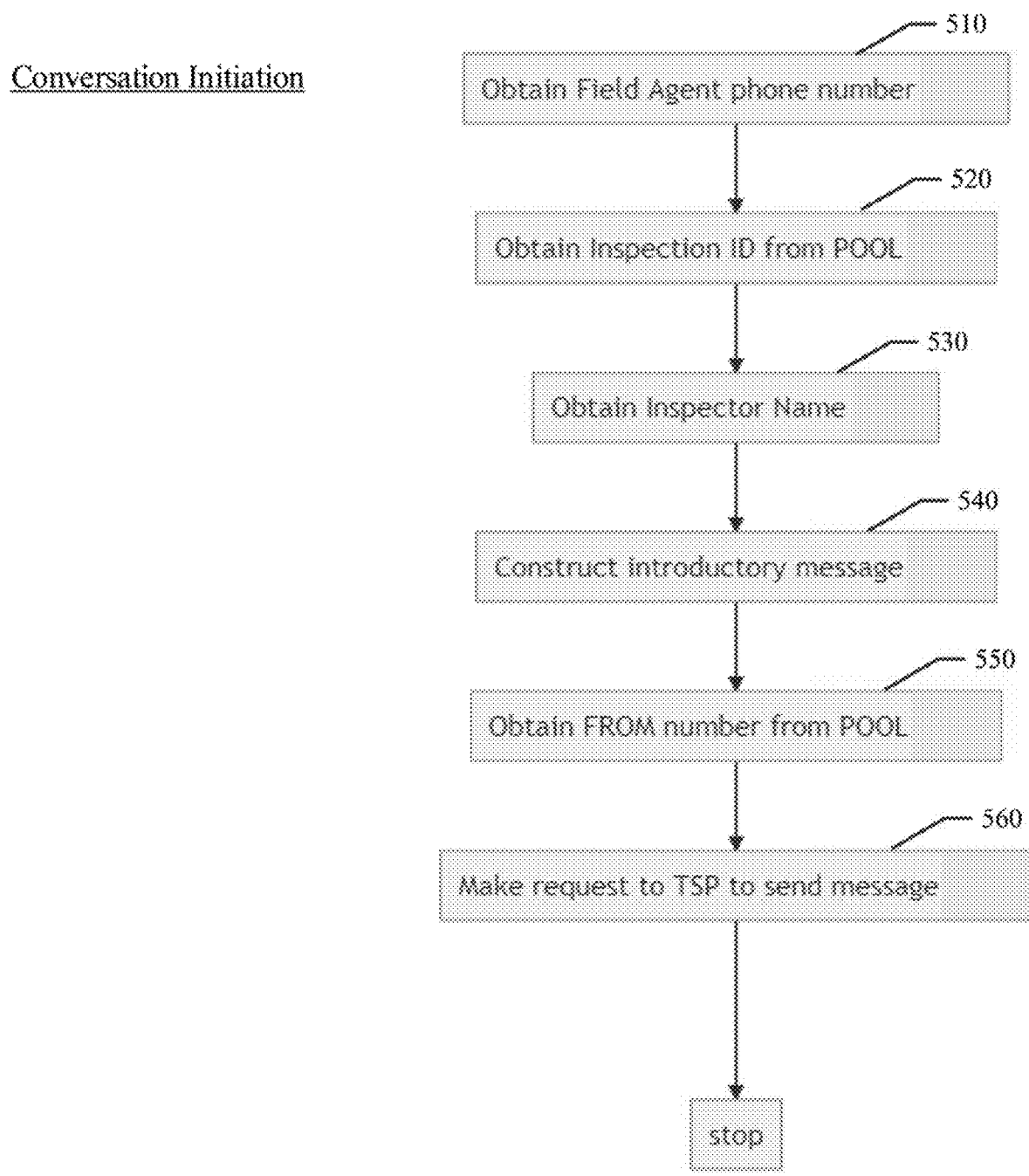
FIG. 5 illustrates an example embodiment of a "Conversation Initiation" process showing the logical flow of the SMS conversation being initiated.

Referring now to FIG. 5, the diagram illustrates an example embodiment of a "Conversation Initiation" process showing the logical flow of an SMS conversation being initiated between FA 600 and INSP 200. Given the data retained in POOL database 900, the SYSTEM 300 has the data needed to initiate the conversation with the FA 600. In an initial step of the "Conversation Initiation" process in an example embodiment, the SYSTEM 300 can send an introduction text message (e.g., SMS) to the FA 600, via MOB 800, informing the FA 600 of the INSP 200 process, which has authorized the FA 600 to upload media 700 via SMS/MMS messaging. The media 700 can include project content along with other meta-information, such as inspection number, permit number, location, date, or the like. In another embodiment, the media 700 can include an insurance claim number or any other relevant identifying information. In an example embodiment, the SYSTEM 300 can also include in the introduction text message process instructions for the FA 600.

Referring still to FIG. 5, to initiate the SMS/MMS conversation between FA 600 and INSP 200, the SYSTEM 300 first obtains the FA 600 phone number from the POOL database 900 (processing block 510). An inspection ID can be retrieved from the POOL database 900 (processing block 520). The inspector name can be derived or obtained from the inspector ID retrieved from the POOL database 900 (processing block 530). The SYSTEM 300 can construct the introduction text message for the FA 600, wherein, in an example embodiment, the introduction text message can contain a name or identifier of the originator of the media 700 transmission (e.g., a name or number of the FA 600, phone number allocated to the FA 600, a name or identifier of a project or job, or other identifier corresponding to a "From Name"). The introduction text message can also include an inspection ID, process instructions, and an indication of a time limit (expiration time) corresponding to how long the phone number is allocated for use by the FA 600 (processing block 540).

In processing block 550, the SYSTEM 300 can obtain from the POOL database 900 the outgoing phone number to use for communicating with the FA 600 and for the media 700 upload by the FA 600. As described above, outgoing phone numbers for media 700 uploads can be obtained from the TSP 500. Finally, the SYSTEM 300 sends a data communication to the TSP 500 requesting the TSP 500 to send the introduction text message to the FA 600 (processing block 560). In an example embodiment, the data communication to the TSP 500 can be sent as an API request. At this point, the FA 600 has been allocated a phone number for the media 700 upload and has received an introduction text message prompting and enabling the FA 600 to begin the media 700 upload. Because the TSP 500 was used to allocate the phone number for the media 700 upload with a webhook or callback feature enabled, the TSP 500 receives the message with the media 700 upload from the FA 600; because, the TSP 500 handles the endpoint of the communication and performs the webhook processing described in more detail below.

FA Media Upload

Figure 6:
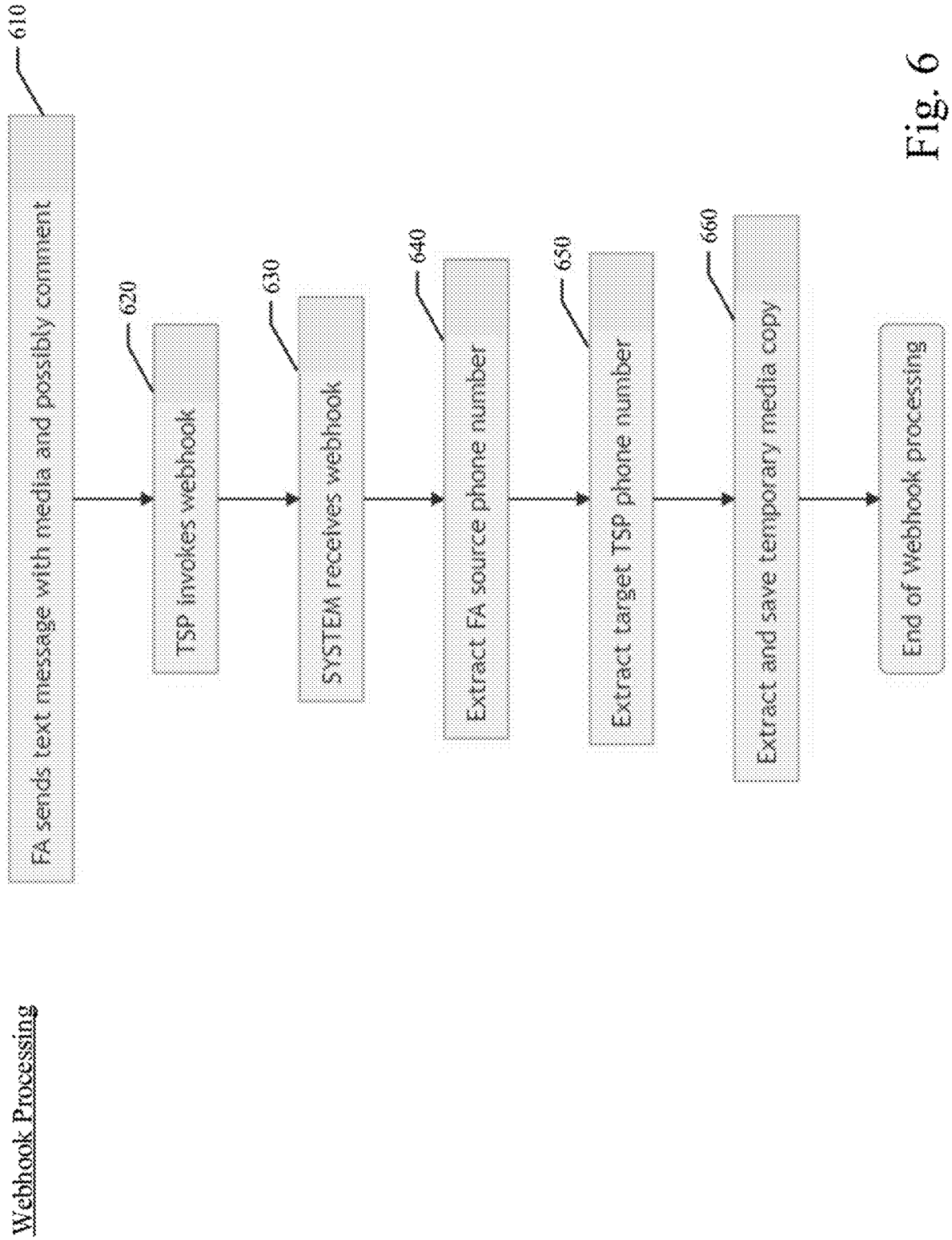
FIG. 6 illustrates an example embodiment of a "Webhook Processing" process showing the logical flow of how to process a webhook from the telephony service provider ("TSP")

Referring now to FIG. 6, the flow diagram illustrates an example embodiment of a "Webhook Processing" process showing the logical flow of how to process a webhook or other conditional notifier from the TSP 500. Because the FA 600 has been allocated a phone number for the media 700 upload and has received an introduction text message as described above, the FA 600 can begin sending a text message with the media 700 upload along with any additional comments or information (processing block 610). As such, the FA 600 can text in a media file 700 (e.g., video, image, PDF file, text file, spreadsheet, etc.) using the allocated phone number. The TSP 500 receives the text message with the media 700 as TSP 500 handles the endpoint of the communication. The TSP 500 can forward the message from FA 600 to SYSTEM 300 by invoking the webhook, which was configured in the manner as described above. This action includes sending the webhook to the SYSTEM 300 (processing block 620).

In processing block 630, the SYSTEM 300 can receive the webhook from the TSP 500 in response to the FA 600 texting in the media file 700. The payload of the webhook can include the media being uploaded, the source phone number, the target phone number to which the media content was sent, and other meta-information specific to the TSP 500. The SYSTEM 300 can extract from the webhook and identify the FA 600 source phone number (processing block 640) and the TSP 500 target phone number to which the media content was sent (processing block 650). The SYSTEM 300 can also extract and save the media content from the webhook in a temporary media copy (processing block 660). Subsequent to the extraction of the media and data from the webhook, the SYSTEM 300 can perform various verification operations to validate the media upload. These verification operations are detailed below.

Verification

Figure 7:
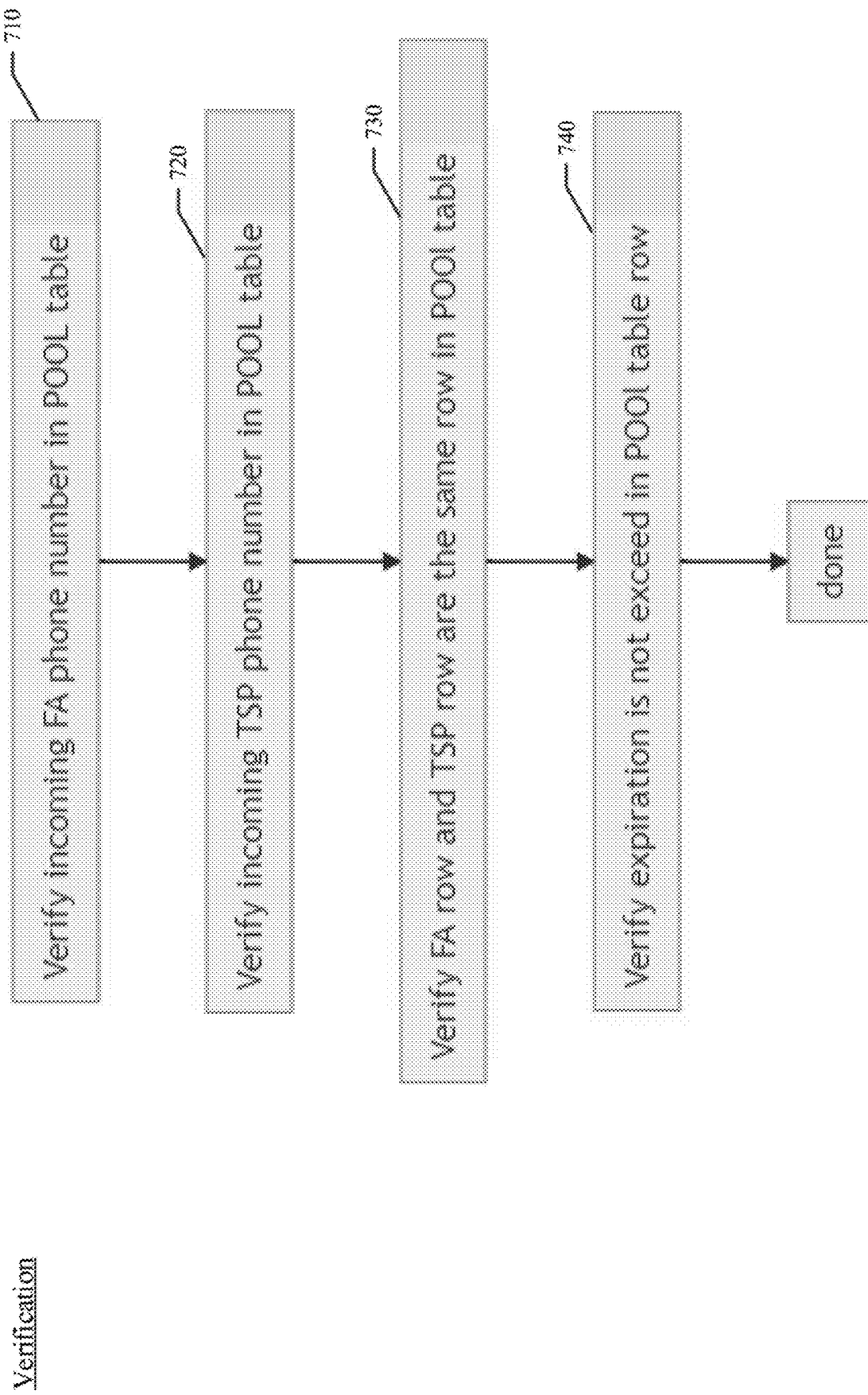
FIG. 7 illustrates an example embodiment of a "Verification" process showing how to verify an incoming SMS/MMS request from the TSP.

FIG. 7 illustrates an example embodiment of a "Verification" process showing how to verify an incoming SMS/MMS message sent via the TSP 500. As described above, the SYSTEM 300 can receive and extract media and data from the webhook from the TSP 500 in response to the FA 600 texting in the media file 700. Referring to FIG. 7, the SYSTEM 300 can verify that the FA 600 phone number (processing block 710) and the TSP 500 phone number (processing block 720) extracted from the webhook match the configuration that was stored in the POOL database 900 when the media upload operation was initially configured. In particular, the SYSTEM 300 can verify that the FA 600 phone number and the TSP 500 phone number are resident in the same row of the POOL database 900 (processing block 730), which will be the case for a properly configured media upload operation. As described above and shown in FIG. 4, each row of the POOL database 900 forms an association between an FA 600 phone number, a TSP 500 phone number, an INSP 200 inspection identifier, and a corresponding expiration time/date. If the FA 600 phone number and the TSP 500 phone number are resident in the same row of the POOL database 900, the SYSTEM 300 can locate and obtain the corresponding INSP 200 inspection identifier by examining the row of the POOL database 900 in which the FA 600 phone number is combined with the TSP 500 phone number as stored in the POOL database 900. The INSP 200 inspection identifier is used to determine how to process and dispatch the media file 700 that was included in the incoming SMS/MMS request sent via the TSP 500. Additionally, the SYSTEM 300 can use the expiration time/date resident in the same row of the POOL database 900 to determine if the FA 600 has exceeded the maximum time that was allowed for the FA 600 to use the TSP 500 phone number (processing block 740). If the maximum time has been exceeded, in an example embodiment, a message or notification can be sent to the TSP 500 (and forwarded to the FA 600) explaining that the time has expired and providing other corrective or helpful information. After the SYSTEM 300 has verified the FA 600 phone number and the TSP 500 phone number, obtained the INSP 200 inspection identifier, and verified that the expiration time/date has not expired, the media file 700 provided by the FA 600 can be processed as described below.

Processing of the MEDIA

Figure 8:
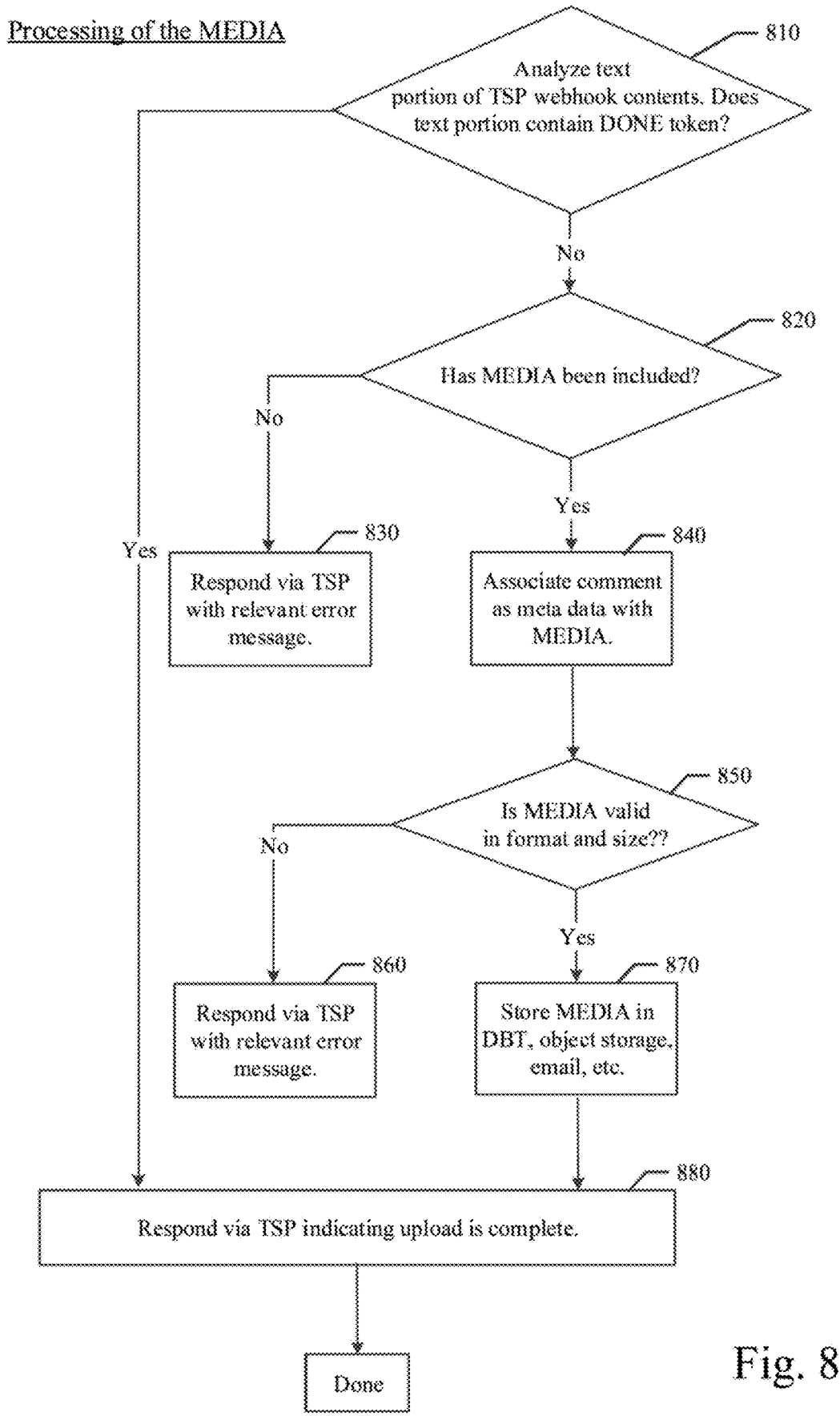
FIG. 8 illustrates an example embodiment of a "Processing of the MEDIA" process showing how to accept and manage incoming MEDIA for the inspection.

FIG. 8 illustrates an example embodiment of a "Processing of the MEDIA" process showing how to accept and manage incoming media for a particular inspection or other media upload operation. The media file 700 in the incoming SMS/MMS message sent via the TSP 500 as described above can contain media, text, or both media and text. Referring to FIG. 8, if the media file 700 contains text, the text content can be analyzed, in an example embodiment, to determine if the text content contains a DONE token indicating the FA 600 has completed the media upload (decision block 810). If the text content contains the DONE token, processing continues at processing block 880 with the "Completion of Upload" processing described below in connection with FIG. 9. Additionally, the SYSTEM 300 can send a data communication to the TSP 500 notifying the TSP 500 that the media upload is complete. In another embodiment, a timeout period with no subsequent response (if no DONE is received) constitutes an equivalent state of receiving a DONE token. This can be done by maintaining the last incoming response in a separate database table and a "CRON" process that runs periodically to look for cases where the FA 600 has not sent an explicit DONE token.

Referring still to FIG. 8 at decision block 810, if the text content of the media file 700 does not contain the DONE token, processing continues at decision block 820. In this case, the text is treated as meta-information to be associated with the media. The text, if any, can also be maintained in connection with the media in a database, email, Amazon™ S3 storage, or Microsoft™ Azure BLOB storage, etc. At decision block 820, a determination is made whether the media file 700 includes media content. If the media file 700 does not include media content, a data communication is sent to the TSP 500 notifying the TSP 500 of a media content error condition (processing block 830). If the media file 700 does include media content, the text portion of the media file 700 is associated with the media content as a meta-data comment (processing block 840). The subsequent processing of the media content is handled in processing blocks 850 through 870 as described below and shown in FIG. 8.

The ultimate processing of the media content of the media file 700 can be application dependent. In an example embodiment, the media content may be stored in another database for use by another system. In another embodiment, the media content can be forwarded via email to an email address. In another embodiment, the media content can be stored in a binary object storage system like Amazon™ S3 or Microsoft™ Azure BLOB storage.

Referring again to FIG. 8 at decision block 850, the SYSTEM 300 may verify whether the incoming media file 700 is of a proper media file type (e.g., JPEG, PNG, TIFF, MP4, etc.). This verification can include determining if the media file 700 is in a proper format and of a valid size. If the media file 700 is not of a proper media file type or is not in a proper format or size, a data communication is sent to the TSP 500 notifying the TSP 500 of a media content error condition (processing block 860). If the incoming media file 700 is of a proper media file type and is in a proper format and size, processing continues at processing block 870 shown in FIG. 8.

In an example embodiment, the SYSTEM 300 can properly accept multiple media items in a single webhook from the TSP 500, wherein the webhook can contain multiple media items from the FA 600. Each of the multiple media items can be processed as described above in view of possible rules or constraints per a given set of application requirements.

Referring again to FIG. 8 at processing block 870, once the media file 700 is processed as described above, the processed media content can be stored in a database, email, Amazon™ S3 storage, or Microsoft™ Azure BLOB storage, etc. The SYSTEM 300 can send a data communication to the TSP 500 notifying the TSP 500 that the media file 700 upload is complete (processing block 880). The SYSTEM 300 can also send a data communication to the corresponding INSP 200 process notifying the INSP 200 process that the media file 700 upload is complete. In a particular embodiment, the SYSTEM 300 can also send the content of the media file upload in a data communication to the corresponding INSP 200 process after the media file 700 upload is complete. Additionally, the FA 600 can be notified of the completion of the media file 700 upload. The notifications may include an indication of the type of the media file 700 processed (e.g., image, JPEG, etc.) and/or instructions for subsequent actions to be taken by the FA 600.

Completion of Upload

Figure 9:
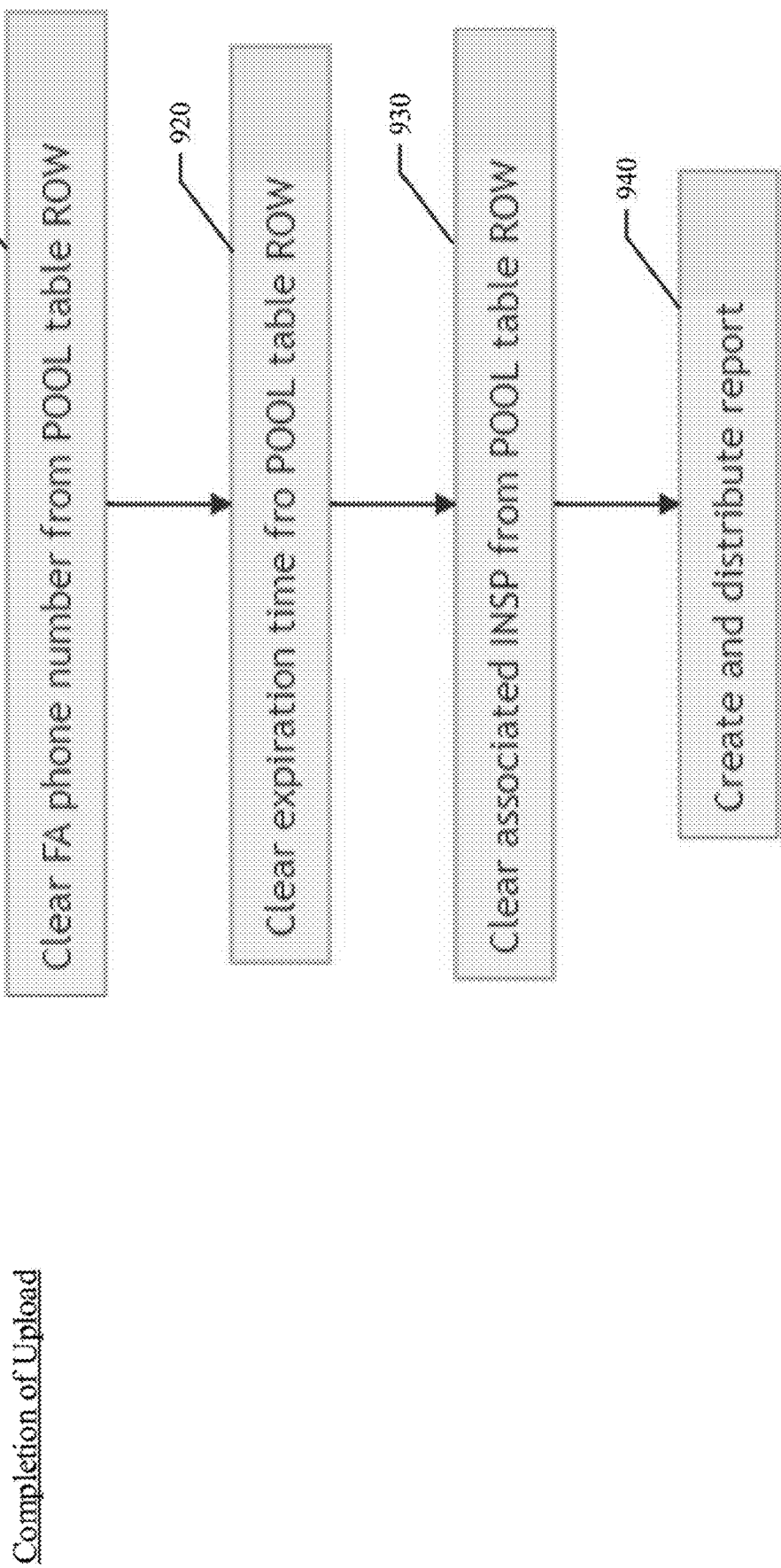
FIG. 9 illustrates an example embodiment of a "Completion of Upload" process showing the steps when the Field Agent (FA) sends "done" or other indicator of no more MEDIA to upload.

FIG. 9 illustrates an example embodiment of a "Completion of Upload" process showing the operational steps in an example embodiment performed when the FA 600 sends a DONE token or other indicator of the completion of the media upload. Referring to FIG. 9, once the FA 600 has indicated they have no additional media to upload, the SYSTEM 300 can mark the POOL database 900 entry or row as available for use by another INSP 200 process. This operation can include clearing the FA 600 phone number from the POOL database 900 row (processing block 910), clearing the expiration time/date from the POOL database 900 row (processing block 920), and clearing the INSP 200 process identifier from the POOL database 900 row (processing block 930). These operations can also include ensuring there is no prior association between with the FA 600 and the TSP 500 in the POOL database 900 row.

In an example embodiment, some post processing can occur once the submittal or upload of the media file 700 is complete. In an example embodiment, a report and/or a confirmation number can be created and distributed based on the processed media content items (processing block 940). The report and/or confirmation number can be distributed via email, fax, text message, or other similar means. In another embodiment, a report and/or a confirmation number can be created and stored in a database.

Figure 10:
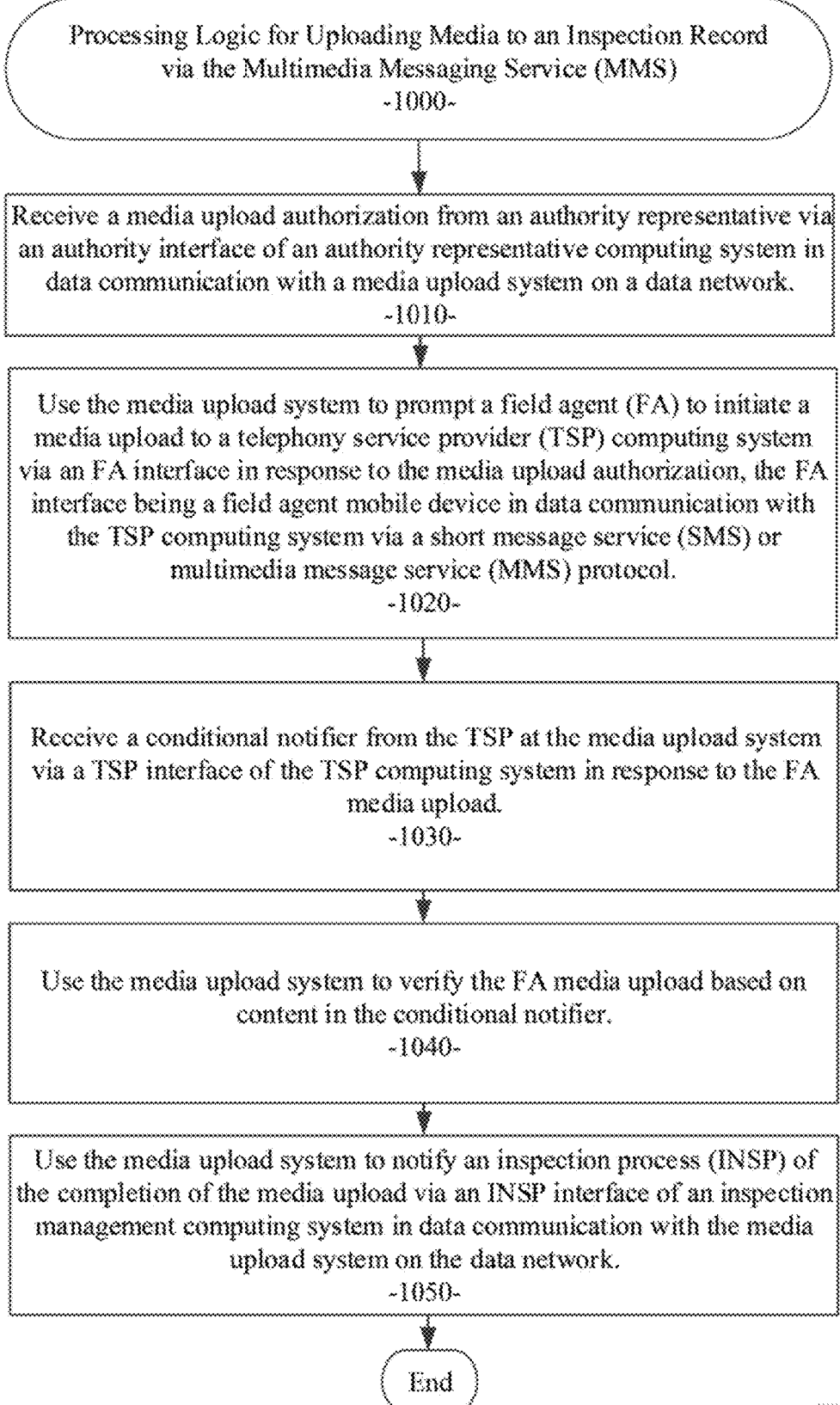
FIG. 10 is a processing flow diagram that illustrates an example embodiment of a method as described herein.

Referring now to FIG. 10, a processing flow diagram illustrates an example embodiment of a method as described herein. The method 1000 of an example embodiment can include: receiving a media upload authorization from an authority representative via an authority interface of an authority representative computing system in data communication with a media upload system on a data network (processing block 1010); using the media upload system to prompt a field agent (FA) to initiate a media upload to a telephony service provider (TSP) computing system via an FA interface in response to the media upload authorization, the FA interface being a field agent mobile device in data communication with the TSP computing system via a short message service (SMS) or multimedia message service (MMS) protocol (processing block 1020); receiving a conditional notifier from the TSP at the media upload system via a TSP interface of the TSP computing system in response to the FA media upload (processing block 1030); using the media upload system to verify the FA media upload based on content in the conditional notifier (processing block 1040); and using the media upload system to notify an inspection process (INSP) of the completion of the media upload via an INSP interface of an inspection management computing system in data communication with the media upload system on the data network (processing block 1050).

In various example embodiments described herein, a computer-implemented system and method for uploading media to an inspection record via the multimedia messaging service (MMS) are disclosed. In the various example embodiments described herein, a computer-implemented tool or software application (app) as part of a media upload system is described to automate and improve the ability for a user Authority representative to authorize a media upload from a Field Agent operating a mobile device that supports SMS and MMS. The Authority representative can identify an inspection for which they will allow texted-in media artifacts by the Field Agent. In various example embodiments described herein, the media upload system provides a series of devices and processes to facilitate the capture and uploading of inspection artifacts to one or more of a plurality of network-connected recipients. As a result, the described embodiments improve the fields of data communication, network connectivity, network-based media content uploading and publication, and provide an improved ability for Authority representatives, Field Agents, and Telephony Service Providers to efficiently connect, engage, and communicate with each other for an inspection or other activity.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
receiving a media upload authorization from an authority representative via an authority interface of an authority representative computing system in data communication with a media upload system on a data network;
using the media upload system to prompt a field agent (FA) to initiate a media upload to a telephony service provider (TSP) computing system via an FA interface in response to the media upload authorization, the FA interface being a field agent mobile device in data communication with the TSP computing system via a short message service (SMS) or multimedia message service (MMS) protocol;
receiving a conditional notifier from the TSP at the media upload system via a TSP interface of the TSP computing system in response to the FA media upload;
using the media upload system to verify the FA media upload based on content in the conditional notifier; and
using the media upload system to notify an inspection process (INSP) of the completion of the media upload via an INSP interface of an inspection management computing system in data communication with the media upload system on the data network.

2. The method of claim 1 wherein the authority interface is a graphical user interface (GUI) or an Application Programming Interface (API).

3. The method of claim 1 including accessing a pool database to obtain information identifying a particular inspection activity and information identifying a corresponding FA.

4. The method of claim 1 including accessing a pool database to obtain information identifying a particular inspection activity, information identifying a corresponding FA, and information specifying a corresponding expiration time.

5. The method of claim 1 including using the media upload system to request the TSP via the TSP interface to issue a new phone number allocation.

6. The method of claim 5 including adding the new phone number allocation to a pool database in association with a particular INSP process.

7. The method of claim 1 wherein prompting the FA to initiate a media upload to the TSP includes sending an introduction text message from the media upload system to the FA via the FA interface.

8. The method of claim 1 including using the media upload system to obtain from a pool database an outgoing phone number to use for communicating with the FA and for the media upload.

9. The method of claim 1 including using the media upload system to extract from the conditional notifier media being uploaded by the FA, a source phone number, and a target phone number to which media content was sent by the FA.

10. The method of claim 1 including mapping a dynamically allocated phone number to a specific inspection record.

11. The method of claim 1 including allowing a specific period of time for which a dynamically allocated phone number is available for use by the FA for the media upload.

12. The method of claim 1 including specifying a maximum number of allowable dynamically allocated phone numbers in a pool database.

13. The method of claim 1 including creating a new record in a pool database with a new telephony phone number when a determination is made that all available phone numbers are in use or otherwise reserved for incoming messages for a given duration of time.

14. The method of claim 1 wherein prompting the FA to initiate a media upload includes providing the FA with a specific INSP identifier corresponding to the media upload.

15. The method of claim 1 including receiving at the media upload system a done token indicating that the media upload is complete.

16. The method of claim 1 including sending a confirmation number by the media upload system when the media upload is complete.

17. A system comprising:
a media upload system in data communication on a data network;
an authority interface of an authority representative computing system in data communication with the media upload system on the data network;
a telephony service provider (TSP) interface of a TSP computing system in data communication with the media upload system on the data network;
an inspection process (INSP) interface of an inspection management computing system in data communication with the media upload system on the data network;
a pool database in data communication with the media upload system;
a field agent (FA) interface of a field agent mobile device in data communication with the TSP computing system via a short message service (SMS) or multimedia message service (MMS) protocol;
wherein the media upload system is configured to:
receive a media upload authorization from the authority representative via the authority interface;
prompt the FA to initiate a media upload to the TSP via the FA interface in response to the media upload authorization;
receive a conditional notifier from the TSP via the TSP interface in response to the FA media upload;
verify the FA media upload based on content in the conditional notifier; and
notify the INSP of the completion of the media upload.

18. The system of claim 17 being further configured to access a pool database to obtain information identifying a particular inspection activity, information identifying a corresponding FA, and information specifying a corresponding expiration time.

19. The system of claim 17 being further configured to use the media upload system to request the TSP via the TSP interface to issue a new phone number allocation.

20. The system of claim 17 being further configured to add a new phone number allocation to a pool database in association with a particular INSP process.

* * * * *